United States Patent
Bjornsson et al.

(10) Patent No.: US 7,240,131 B1
(45) Date of Patent: Jul. 3, 2007

(54) METHOD AND APPARATUS FOR IMPROVING THE PROCESS OF MAKING INDEPENDENT DATA COPIES IN A DATA PROCESSING SYSTEM

(75) Inventors: Magnus E. Bjornsson, West Newton, MA (US); Gilad Sade, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 443 days.

(21) Appl. No.: 10/795,851

(22) Filed: Mar. 8, 2004

(51) Int. Cl.
*G06F 17/30* (2006.01)
*G06F 13/00* (2006.01)

(52) U.S. Cl. .................. 710/33; 710/20; 707/10; 707/203

(58) Field of Classification Search ............... 707/10, 707/203; 711/111–114, 165; 710/5–6, 20, 710/33
See application file for complete search history.

(56) References Cited

U.S. PATENT DOCUMENTS

| | | | |
|---|---|---|---|
| 6,101,497 A | 8/2000 | Ofek | |
| 6,363,385 B1 | 3/2002 | Kedem et al. | |
| 6,393,540 B1* | 5/2002 | Blumenau et al. | 711/165 |
| 6,968,435 B2* | 11/2005 | Shimoda | 711/165 |
| 7,028,137 B2* | 4/2006 | Nashimoto et al. | 711/112 |
| 7,031,966 B2* | 4/2006 | Kedem et al. | 707/10 |
| 7,039,659 B2* | 5/2006 | LeCrone et al. | 707/203 |
| 7,099,875 B2* | 8/2006 | Kedem et al. | 707/10 |
| 2003/0167312 A1* | 9/2003 | Mori | 709/212 |

* cited by examiner

*Primary Examiner*—Christopher Shin
(74) *Attorney, Agent, or Firm*—George A. Herbster

(57) ABSTRACT

A PRECOPY command identifies source and destination devices. Data begins to transfer from the source device to the destination device in a background mode under the control of a copy program that transfers the data on a track-by-track basis. Changes to the data tracks are monitored in three lists. The copy program monitors the first two lists to determine when a data track in a source device has been written and needs to be retransferred to the destination device to provide the most up to date data. Procedures assure that any data access to a particular track in either the source by any application prior to the activation of a formal transfer are accommodated to maintain data integrity. An ACTIVATE command makes the destination device available to another application and activates another copy operation. Procedures assure that any data access to a particular track in either of the source or destination devices by any application prior to the transfer of that track are accommodated to maintain data integrity.

30 Claims, 12 Drawing Sheets

METHOD AND APPARATUS FOR IMPROVING THE PROCESS OF MAKING INDEPENDENT DATA COPIES IN A DATA PROCESSING SYSTEM

BACKGROUND OF THE INVENTION

1. Field of the Invention

This invention generally relates to data storage and more particularly to a method and apparatus for improving a copy process for transferring data from one storage device to one or more other storage devices.

2. Description of Related Art

Copying data from a first set of storage locations, commonly, called a "source" or "source device", to a second set of storage locations, called a "destination" or "destination device", is well known in the art. In some situations copying provides data redundancy. In other situations providing two or more copies enables a like number of independent applications or procedures to process the copied data independently.

In one conventional approach, as particularly well known in the use of personal computers and early mainframe systems, a host application "copy" command initiates a data copying procedure whereby the data is transferred on a file-by-file basis between different logical devices or between different directories or folders on the same logical device. Such copy commands specify a path to a source file to be copied and a path to an initial destination storage location.

In personal computers and early mainframe systems processors copied the data from the source device to the destination device as a primary application. During this copy process no other application could access the data in the file at either of the source or destination devices. In some situations, the copy process could consume so much processing time that all other applications were effectively prevented from operating. In other situations it was necessary to assure that no other application interacted with the source or destruction during the copy phase to avoid corrupting the data.

Newer data processing systems include larger and more sophisticated data storage facilities. In personal computer and early mainframe systems, a systems administrator would configure physical disk storage into a limited number of logical devices. For example, a personal computer with two physical disk storage devices might be formatted into "C" and "D" logical devices. The second physical device might also be formatted into "D" and "E" logical devices.

Newer storage facilities allowed an administrator to configure the physical disk storage into hundreds and even thousands of logical devices with each logical device being assigned on some basis to store related data or application programs. In addition these systems are designed to interact with multiple applications that operate on multiple host processors. In these facilities a copy application performs copying independently of other host applications. That is, while data is being copied from a source device to a destination device, other applications can operate on data in other than the source and destination devices. Still in these systems access by an application other than the copy application to the source or destination device was often blocked until such time the copy application was completed.

Concurrently with this increase in storage facility sophistication, data processing systems were evolving into two arbitrary classes, namely: "mainframe systems" and "open systems". Generally speaking "mainframe systems" refer to larger IBM and IBM-like data processing systems with a powerful set of internal input-output commands that use CKD (Count-Key-Data) data formatting. "Open systems" refer to other data processing systems that operate with different internal input-output commands and different internal protocols and an FBA (Fixed Block Architecture).

Initially large capacity data storage facilities were configured for operation with mainframe systems because at the time they were the only systems that had the power and storage capacity to handle large data sets. These systems also provided a data track level of control and had several ways to copy data from one location to another. Over time steps were taken to enhance the procedures for copying data from one logical device to another transparently to other applications.

For example, U.S. Pat. No. 6,101,497 to Ofek, and assigned to the same assignee of this invention, discloses a process for obtaining a single copy of data by logical volume or device essentially independently of normal processing. This process identifies a first, or production, logical volume as a source and a specifically configured logical volume as a logical volume or destination. The user initials an "establish" process by which the target logical volume is brought into synchronism with the production logical volume. During this process the target logical volume is not available to any other process. When a snapshot of the logical volume is taken, a "split" occurs whereupon the data in the target logical volume is available as a copy for other applications. This data does not reflect any changes to the production volume.

This process is limited to the transfer of entire logical volumes. However, many circumstances arise when there is a need to transfer a data set or file existing in only a portion of a logical volume. U.S. Pat. No. 6,363,385 (2002) to Kedem et al., and assigned to the same assignee of this invention, discloses a method and apparatus for making independent data copies in a mainframe data processing system in which copies are made of such data sets or files. Specifically, this patent discloses a method for copying a selected portion of a logical volume, called an "extent", from a source device to a destination device in response to a copy command that can identify noncontiguous blocks of contiguous tracks in an extent that contain the data set or file. An extents track establishes an environment in which the data will be copied. A calling system receives an immediate response that the copy operation is complete even though no data has been copied. Application programs may then access the file in either of the source or destination devices. The copy program transfers the file on a track-by-track basis to the storage locations in the destination device in accordance with the information in the extents track. Procedures to assure that any data access to a particular track in either of the source or destination devices by any application prior to the transfer of that track are accommodated to maintain data integrity.

Recently open systems have been enabled to interact with large-scale data storage facilities as advances in networking and hardware capabilities have been made. Open systems, however, do not have commands with the capability of handling data on a track-by-track or extent basis. Moreover, logical devices in open systems tend to be smaller than logical devices in mainframe systems. Consequently, in open systems copies are still made on a logical device basis. U.S. patent application Ser. No. 10/705,772 filed Nov. 10, 2003, and assigned to the same assignee of this invention, describes how the process of U.S. Pat. No. 6,363,385 can be adapted to operate with open systems.

Both the mainframe system and open system implementations of this copying process are characterized by initializing a three-phase process that includes: (1) a "create" phase, (2) an "active copy" or "active" phase and (3) a "termination" phase. In these implementations controllers in disk adapters associated with each physical disk storage device implement the various phases in response to commands from a host or system manager. For example, in U.S. Pat. No. 6,363,385 a requesting host application issues a FILE SMMF command with a syntax that constitutes a "CREATE" command for initiating the "create" phase to allocate resources within the data storage facility necessary to establish an environment for the subsequent copy process. The syntax in the CREATE command may also initiate the "active" phase automatically. Alternatively, the syntax of the CREATE command may also terminate response of the "create" phase after the environment is established.

A FILE SMMF command with a different syntax constitutes an "ACTIVE COPY" command that, as previously indicated, may be included in the CREATE command or may be a separate command. The ACTIVE COPY command makes the destination logical device available to host applications and initiates the copying process.

A FILE SMMF command with still another syntax constitutes a "TERMINATION" command. The TERMINATION command is generated any time after all the data is transferred from the source device to the destination device. This command releases the resources allocated during the create phase so that the resources are available for other procedures.

This approach was acceptable because at that time the size of the data transfers were limited. Consequently the process did not adversely impact the operation of the disk storage facility and the host applications that accessed the disk storage facility. That is the copying operation was essentially transparent to host applications.

Over time customers for these data storage facilities increased their demands for performance in various areas. One such area has involved the generation of copies of tens or hundreds of logical devices at a given point in time. Customers use the copies for various purposes. Use of the copies for backup and for report generation represent two such purposes. With the foregoing systems an ACTIVE COPY command would have to issue for each logical device or group of one or more extents in a logical device to be copied. If the overall objective was to obtain a point-in-time copy from each of hundreds of source logical devices, the initial load as copy programs were initiated for each identified source logical device could impose unacceptable delays in the interaction between host applications and the data in the logical devices being copied.

More specifically, in the prior active phase, any attempt by the host to write to the source logical device imposed a certain overhead on the data storage facility for making a priority transfer if the data at a location had not been copied properly. Likewise, a corresponding overhead was imposed each time an application performed either a read or write operation with the destination logical device. With greater use of this copy facility, the time required for the copy process to complete tended to increase with the possibility of unacceptably long response times with respect to the primary purpose of the data storage facility to provide immediate responses to read and write requests from other application programs. In addition, the interval during which internal resources of the data storage facility were allocated to this process also increased.

The possibility of these unacceptable delays and response times has given rise to a need to improve the copy operation to overcome these issues. That is, there is a need to assure that the copy operation does not unduly burden the data storage facility so that the time that resources in the data storage facility are allocated to the copy task is minimized. There is a concomitant requirement that the copy program be improved to assure that essential transparency is retained even as the sizes and complexities of such copy operations continue to increase.

SUMMARY

Therefore an object of this invention is to provide a method and apparatus for copying data from a source device to a destination device in an efficient manner.

Another object of this invention to provide an improved method and apparatus for copying data from a source device to a destination device in a data storage facility that maintains essential transparency with respect to host applications.

Yet another object of this invention is to provide a method and apparatus that enables a process for copying data to complete with a minimal delay.

In accordance with this invention, a data processing system includes a host device with at least two applications for processing data. One of the applications processes data in source device storage locations and enables the copying of that data to predetermined destination device storage locations concurrently with the operation of at least one application in response to commands identifying the predetermined storage locations. A response to a first command establishes a first operating environment including first and second lists of the predetermined source device storage locations and a third list of the predetermined destination device storage locations. Copying occurs in an ordered manner. For each predetermined storage location, the process includes copying the data from one predetermined source device location to a corresponding destination device storage location, updating each of the lists to indicate that the data has been transferred, and responding to a change to a source device storage location for which a copy has been made by updating each of the lists to denote that another transfer needs to occur. A second command establishes a second environment in which the destination device storage locations are available for use by another host application.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Before describing this invention in detail, it will be helpful to define certain terms. This invention is described in terms of an implementation in a direct access storage device (DASD) that includes multiple physical disk drives. Each disk drive comprises a plurality of tracks at physical disk addresses. A device ID, cylinder address and read/write head ID uniquely identify the physical disk address for each data track in a data storage facility. From a user's standpoint, these data tracks are grouped into logical volumes that may store any quantity of data occupying any amount of storage capacity from a few contiguous tracks of a single physical disk drive to contiguous tracks across multiple physical disk drives. Logical volumes are also known as "logical disk storage volumes", "logical storage volumes" and "logical devices". Logical devices are identified by logical addresses including logical device numbers, logical device names and by other conventions. The process for converting a logical address to a physical disk address is known. In a copy operation data will be copied from one logical device to the other. More specifically, data in a "source device storage location" in a "source device" is copied to a "destination device storage location" in a "destination device".

Figure 1:
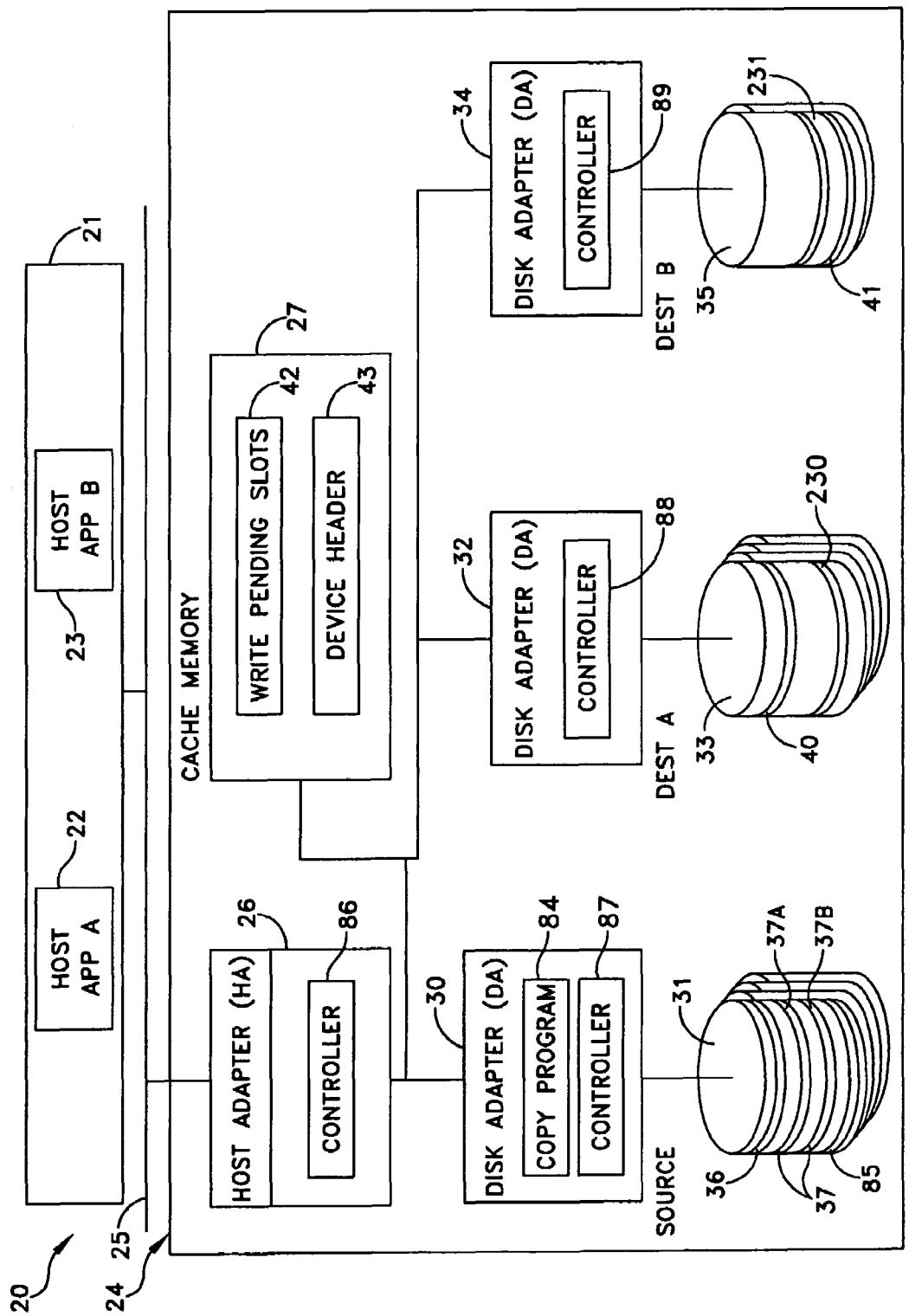
FIG. 1 is a block diagram of a data processing system, including a data storage facility, adapted for implementing this invention.

FIG. 1 depicts a data processing system 20 of the open system type in which a host array 21 with one or more host devices controls operations. Each host device processes a program; and in the following discussion "host application" means a particular application program, procedure, process, module or the like being processed on a host. FIG. 1 depicts two such applications, namely: a HOST APP A application 22 and a HOST APP B application 23.

Each host application accesses and processes data stored in a data storage facility 24 over a system bus 25 that can take any of several known forms including single and parallel bus structures. For purposes of this explanation the data storage facility 24 can be considered to store all the data that will be processed either by HOST APP A application 22 or HOST APP B application 23.

This invention can be implemented in a number of disk storage facilities of different types and configurations. The following description is made in the context of a specific data storage facility 24, namely a Symmetrix disk array storage device (DASD). However, the adaptation of the specifically described embodiments for implementing the invention with other data storage devices will be readily apparent to persons of ordinary skill in the art.

Still referring to FIG. 1, a Symmetrix disk array storage device as a data storage facility 24 includes a host adapter 26 and a cache memory 27 that communicate with each other and with a series of disk adapters and physical disk storage devices. FIG. 1 depicts, for example, a first disk adapter (DA) 30 with an array of physical disk storage devices that store one or more logical volumes including a logical device 31; a disk adapter 32 stores a logical device 33; and a disk adapter 34 stores a logical device 35. Logical devices may also contain discrete data sets or files. For example, FIG. 1 depicts a first file 36 in a set of contiguous data tracks and a file 37 located in two separated sets 37A and 37B of contiguous data tracks.

An implementation of this invention adapted for open systems provides a transfer of all the data in a single logical device. For example, assume that the host APP A application 22 operates with data on the logical device 31. This invention allows a copy of that data to be made to logical device 33 or 35 for use with the host APP B application 23. For purposes of such a specific transfer, the logical device 31 can be termed a "source device" 31 while the logical device 33, for example, is termed a "destination", or "DEST A", device 33.

Figure 2A:
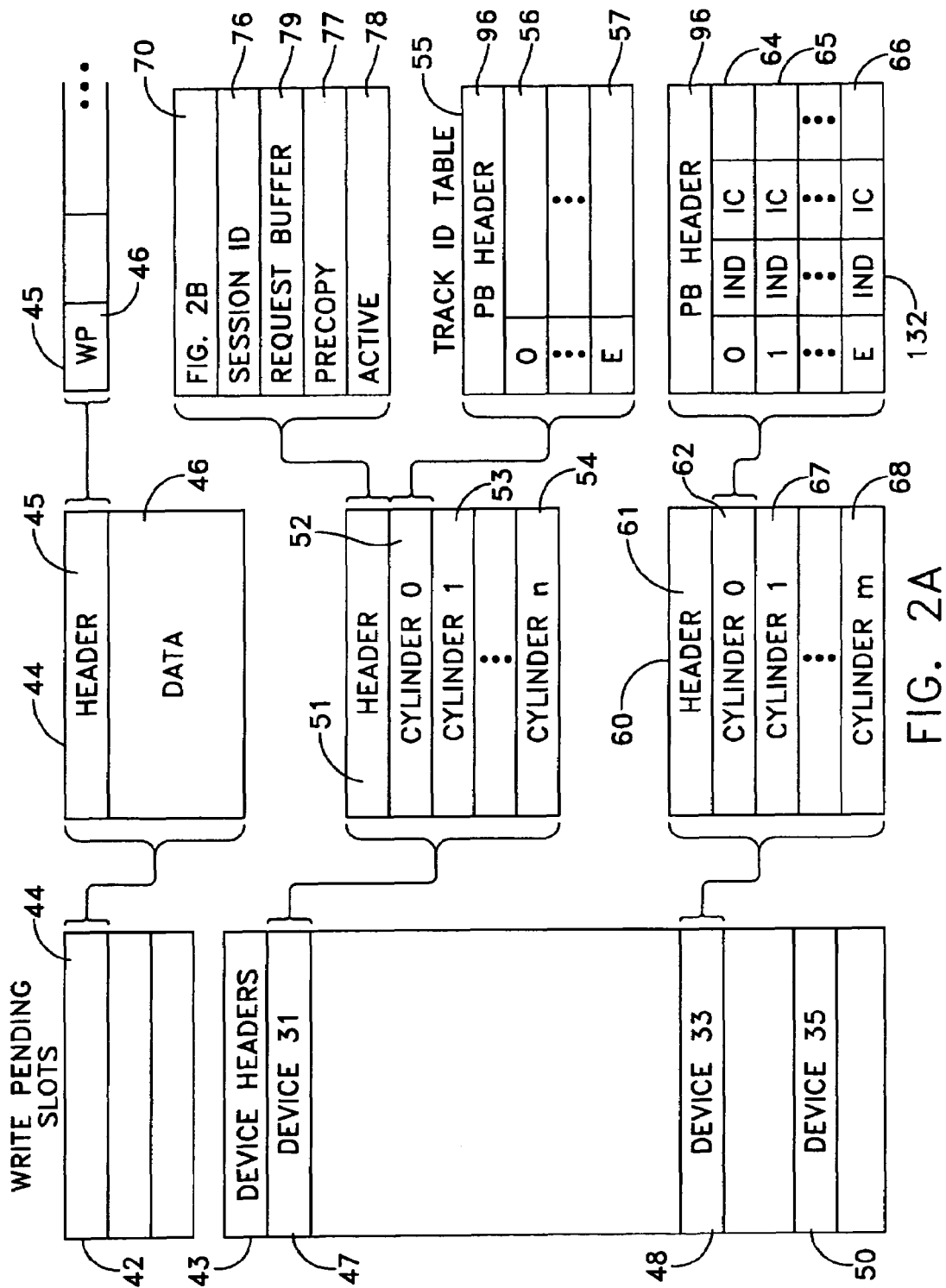
FIGS. 2A, 2B and 2C provide a more detailed description of a cache memory shown in FIG. 1 for an open system.
Figure 2B:
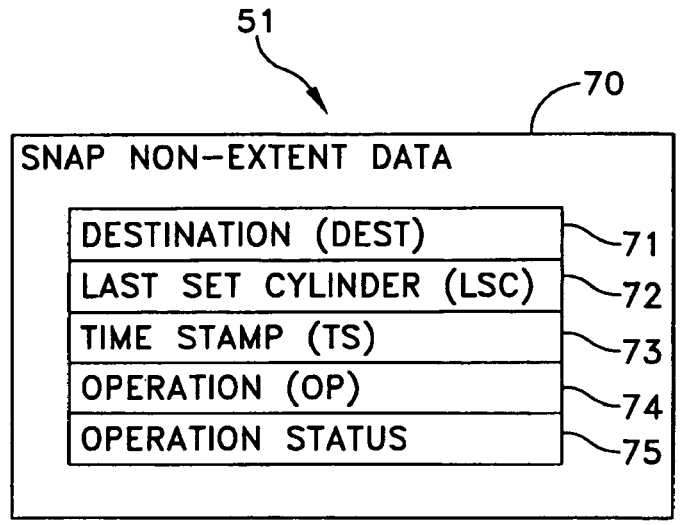

Referring to FIG. 2A, a response to certain copy commands that identify the logical device 31 as the source device is to generate a data structure in the header block 51 of the source device entry 47. As shown in FIG. 2B, the header block 51 includes an OS Copy data structure 70. The data structure 70 includes a DEST data element 71 that contains the initial destination device address of a storage location. An LSC (Last Set Cylinder) data element 72 identifies the last set cylinder in the source device that points to the last cylinder in the source device for which processing has begun. The initial value will be the location of the first cylinder to be transferred.

A TS (Time Stamp) element 73 provides a time stamp that is useful particularly when large quantities of data are to be copied. An OP (Operator) data element 74 identifies a particular operation that is occurring. In the context of the command operating phases, the OP data element indicates which of several operating phases are in progress. An OP STATUS (Operator Status) data element 75 indicates the status of the operation; for example, whether the copy program is in progress, has been completed or has failed. Together the OP data element 74 and operating status disk element 75 define the state of the copy operation. The data structure 70 also includes a set of status flags including an ACTIVE status flag 78 that is discussed later.

Figure 2C:
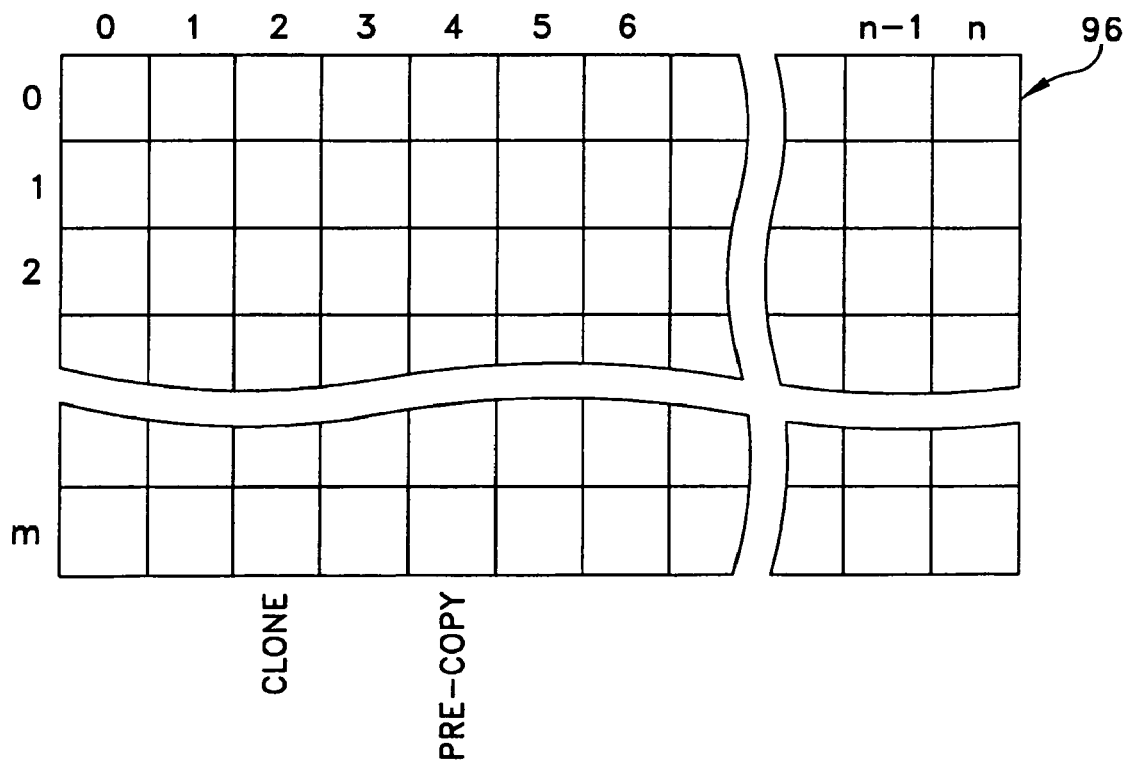

FIG. 2C depicts an organization of a typical PB header that defines a two-dimensional array. The PB header of each track ID header, such as the PB header 96 for cylinder 0, corresponds to the first row of the array. The data storage facility 24 has the capability of supporting a plurality of "n" sessions. In FIG. 2C each column represents a possible session. The process for establishing a session includes identifying, in a status file, the availability of a session, a column in FIG. 2B, and then making the assignment.

In connection with this implementation, the cache memory of FIG. 2A includes a SESSION IDS block 76 and a PRECOPY flag 77 in addition to the ACTIVE flag 78. The SESSION IDS block 76 identifies which available PB sessions have been identified. The PRECOPY flag 77 indicates the system is operating in response to a PRECOPY command. The ACTIVE flag 78 indicates that the system is operating in response to an ACTIVE COPY command.

Referring again to FIG. 1, each host adapter, such as host adapter 26 in the Symmetrix DASD data storage facility 24 and each disk adapter, such as the disk adapters 30, 32 and 34, contains a controller such as a controller 86 in the host adapter 26, a controller 87 in the disk adapter 30, a controller 88 in the disk adapter 32 and a controller 89 in the disk adapter 34. Each such controller has a similar structure and comprises a microprocessor that will include its own random access memory and that has access to the cache memory 27.

With this background, actions within the data storage facility 24, in accordance with this invention, begin when a host application issues a CREATE CLONE command that includes different fields and arguments such a source device and destination device address fields. In any form the basic function of the CREATE CLONE command is to establish an operating environment for copy operation by identifying the source and destination devices. At least one argument can be included in the CREATE CLONE command to control the response to the command. One value argument initiates precopying after the environment is established in accordance with this invention. A CREATE CLONE command with an argument to begin a precopy process is termed a "PRECOPY" command. A second variation of the CREATE CLONE complements the PRECOPY command. It is an ACTIVATE command that makes the destination device available to another host application. The ACTIVATE command can be issued any time after the PRECOPY command. A third variation is an ACTIVE COPY command that establishes other necessary environment and immediately initiates a conventional open-system copy operation after the environment is established. This ACTIVE COPY command performs the procedures in response to the FILE SMMF command described in U.S. patent application Ser. No. 10/705,772. As will be obvious to those of ordinary skill in the art, this information might be contained in a single argument or in a combination of commands and arguments.

As will be described later, the ACTIVE COPY command terminates any ongoing operations in response to the PRECOPY command and immediately makes the destination device available to another application program. During this interval a background copy operation transfers any data from the source device to the destination device not previously transferred in response to the PRECOPY command. A foreground operation associated with the source device assures handling of write operations to the source device. Another foreground operation at the destination device assures handling of both read and write operations.

When all the data has been copied, a TERMINATE command issues whereupon operations in response to the ACTIVE COPY command cease. The TERMINATE command also releases any resources allocated for the entire operation.

Figure 3:
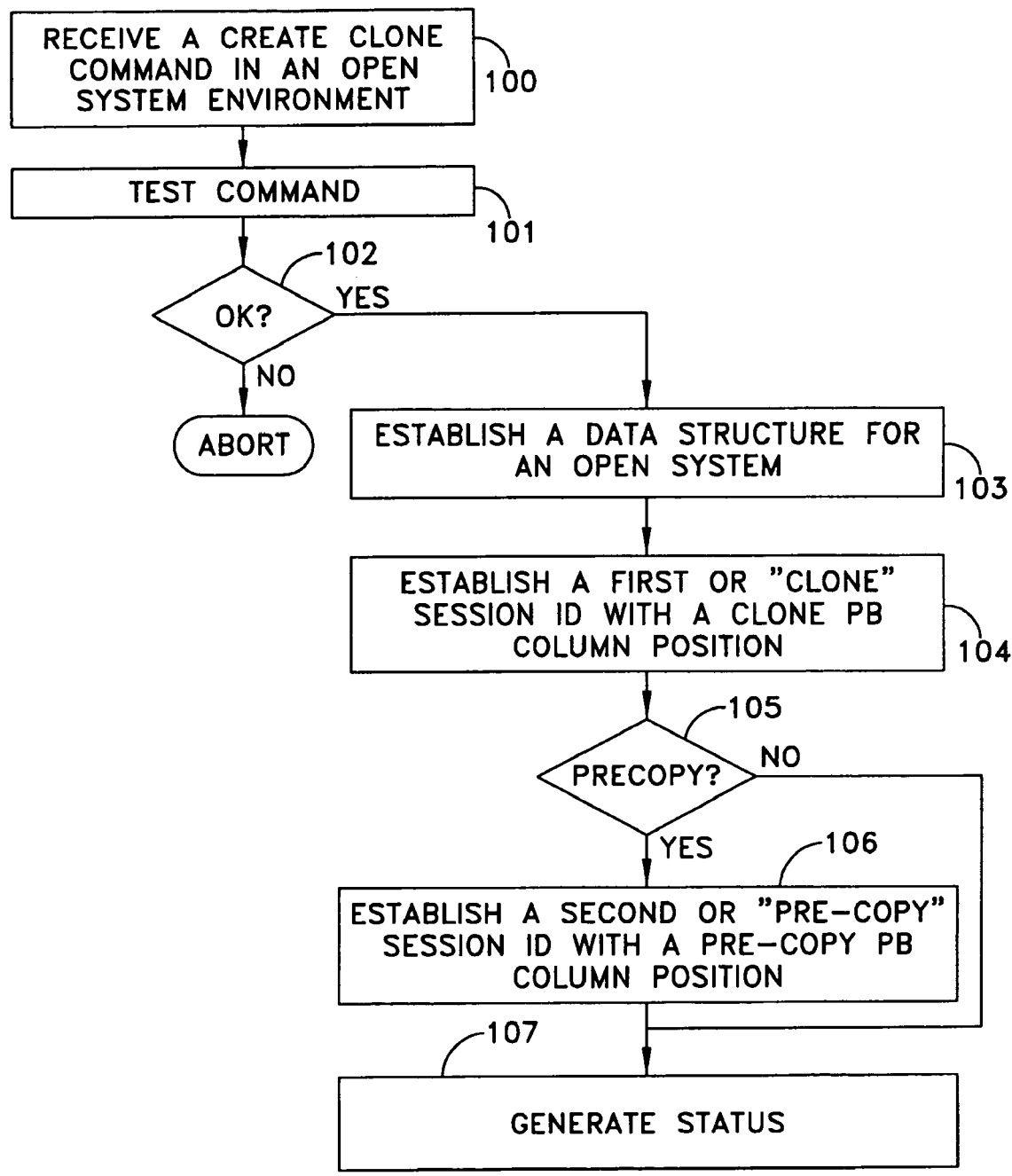
FIG. 3 depicts the response of a data storage facility to a create command.
Figure 4:
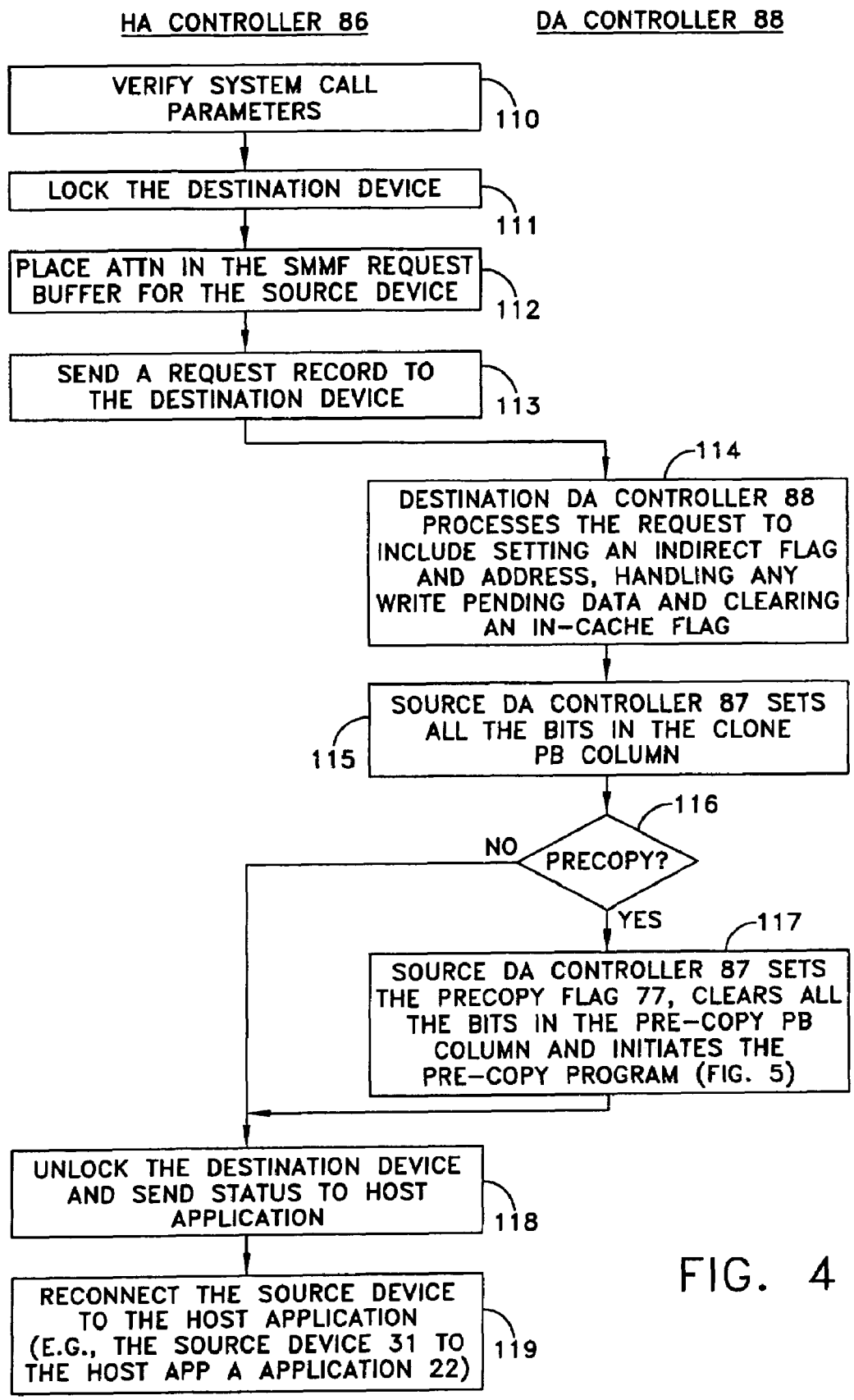
FIG. 4 is a more detailed flow diagram of the process depicted in FIG. 3.

With this background, reference is made to FIGS. 3 and 4 that depict the response to a CREATE CLONE command. In accordance with one aspect of this invention, the processes of FIGS. 3 and 4 establish a first operating environment by generating first and second lists of the predetermined storage locations of the source device and a third list of the predetermined storage locations in the destination device.

When the data storage facility 24 in FIG. 1 receives a CREATE CLONE command in step 100 of FIG. 3, step 101 verifies the command, as by testing syntax other characteristics. Step 102 transfers control to step 103 to an establish operating environment when all the tests are met. Step 103, for example, generates the data structure for the open system as shown in FIG. 2B. Step 103 also could clear the ACTIVE flag 78 in FIG. 2A. Normally clearing the ACTIVE flag 78 would be redundant, however. Step 103 could also provide session information to the SESSION IDS block 76 in FIG. 2A.

Step 104 in FIG. 3 establishes a first session ID. In the following discussion the PB column position selected by step 104 is called the "clone PB column" and the bits in the column are called "clone PB" bits. By way of example, step 104 might identify Column "2" in FIG. 2C as the clone PB column if that column were available. This step also updates the SESSIONS IDS block 76 to denote the correspondence of the selected clone PB column. The clone PB column is one implementation of a first list of the predetermined storage locations in the source device.

If the CREATE CLONE command is interpreted as a PRECOPY command, step 105 establishes a second session to run with the first session. In the specific example, control transfers to step 106 that, by way of example, selects another PB column, such as Column "4" in FIG. 2C as the "pre-copy PB column" if that column were available. This second PB column is an example of an implementation of the second list of storage locations in the source device. This step would also update the SESSION IDS block 76 to denote the correspondence of the selected precopy PB column. Obviously, if the CREATE CLONE command is interpreted as an ACTIVE COPY command step 105 transfers control directly to step 107.

Step 107 generates a status message indicating the success of the operation in FIG. 3 or any errors that may have resulted. If the test of step 102 were failed, control would pass to an "abort" procedure. The use of such procedures is well known in the art.

As previously indicated, there are two alternatives for further action in accordance with this invention. In one, this CREATE command can include an argument indicating that a precopy process should begin immediately. Another alternative is that any further action is held in abeyance until the data storage facility receives a PRECOPY command. In the case of the former, control would pass directly from step 107 in FIG. 3 to step 110 in FIG. 4. In the case of the later, the response to the command would be complete. No further action would occur until the PRECOPY command was received at step 110 in FIG. 4.

When a PRECOPY command is received at a controller, such as the HA controller 86, step 110 in FIG. 4 processes various system call parameters. Then step 111 locks the destination device to avoid any changes occurring during this process. Step 112 sets an ATTN flag in a request buffer 79 in FIG. 2A for the source. Step 113 sends a request record to the destination device. Disk adapter controllers associated with the source and destination devices, such as the controllers 87 and 88 in FIG. 2A, process the request beginning at step 114 in FIG. 4.

Specifically, in step 114 a controller in the destination device, such as the controller 88, sets an indirect (IND) flag 132 in the destination device in FIG. 2A for each track in the destination device. Step 114 also handles any write pending data and clears an in-cache (IC) flag for each track. Collectively the IND bits are an example of a third list of the predetermined storage locations in the destination device. Setting the IND bit for each track initializes the third list to a first state.

Step 115 initializes all the bits in the clone PB column to a first state. In this embodiment, step 115 sets all the PB bits. All the bits in the precopy PB column are initially cleared as one example of a second state and they remain that way. The foregoing steps can also be used to establish an environment for an ACTIVE COPY command. Step 116 determines if a precopy process is indicated. If it is, step 116 transfers control to step 117 that sets the PRECOPY flag 77 in FIG. 2A and initiates the precopy process shown in FIG. 5. Once this occurs control transfers back to the controller 86 to unlock the destination device in step 118. Step 119 sends that status to the host and reconnects the source device to the host application. Thus when the process of FIG. 4 completes, an application, such as the host A application, again interacts with the source device. As will become apparent later, with a PRECOPY command the destination device is not available to any application. However, copying data will begin.

Figure 5:
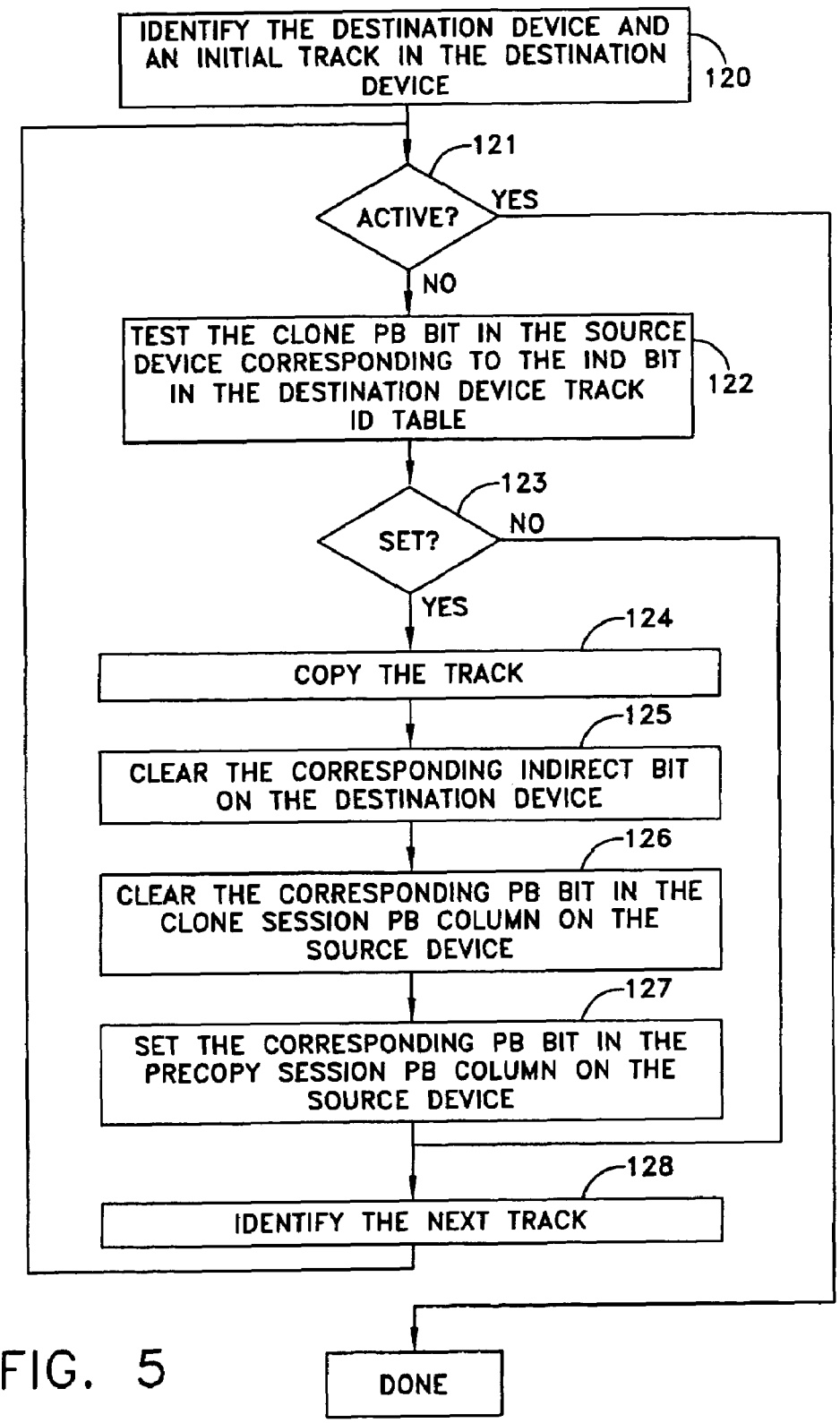
FIG. 5 is a flow diagram of an open system precopy process that is useful in this invention.

After step 117 initiates the precopy process, the controller 88 identifies the destination device and an initial track on that destination device in step 120 of FIG. 5. Step 121 tests active flag 78 in FIG. 2A for the source device. The active flag 78 should be cleared. If it is not, the device is involved in an active copy and no further action can occur, so step 121 diverts control to terminate further operations.

An indirection (IND) bit was set when the session was established. An IND bit is set to intercept any access to a corresponding track on the destination device so data transfers from the corresponding track in the source device to that track in the destination device. Then the IND bit is cleared. As will be apparent both the IND and CLONE PB bit for a given track contain the same information. So when the active flag 78 is cleared, control passes to step 122 that tests the CLONE PB bit for the identified track. If the CLONE PB bit is not set, data in that track has been copied.

More specifically, if the CLONE PB bit is set, step 123 transfers control to step 124 that copies the track. Then step 125 clears the corresponding IND bit. Step 126 clears the CLONE PB bit for the track in the clone PB column while step 127 sets the PRECOPY PB bit for the track in the precopy PB column. After the track has been processed, step 128 identifies a next track and returns control to step 121.

Thus in response to a PRECOPY command, as each track is copied to the destination device, its IND bit at the destination device is cleared. At the source device the corresponding clone PB bit is cleared while the PRECOPY PB bit is set. These actions update each of the three lists to indicate that the data in the track has been transferred.

The precopy process can be initiated a significant time before the ACTIVE COPY command is sent. During this time the source device continues to interact with the host application. It is possible that the host will write to a track in the source device that has already been copied. As will now be described, this event is recorded by changing the corresponding CLONE PB, PRECOPY PB and IND bits. Consequently, the precopy process of FIG. 5 continues in an iterative fashion to copy any data that changes in the source device after the previous data has been transferred to the destination device. More specifically, the precopy process continues until the ACTIVATE command is sent. As has been stated earlier, the ACTIVATE command can be sent at any time after the PRECOPY command.

Figure 6:
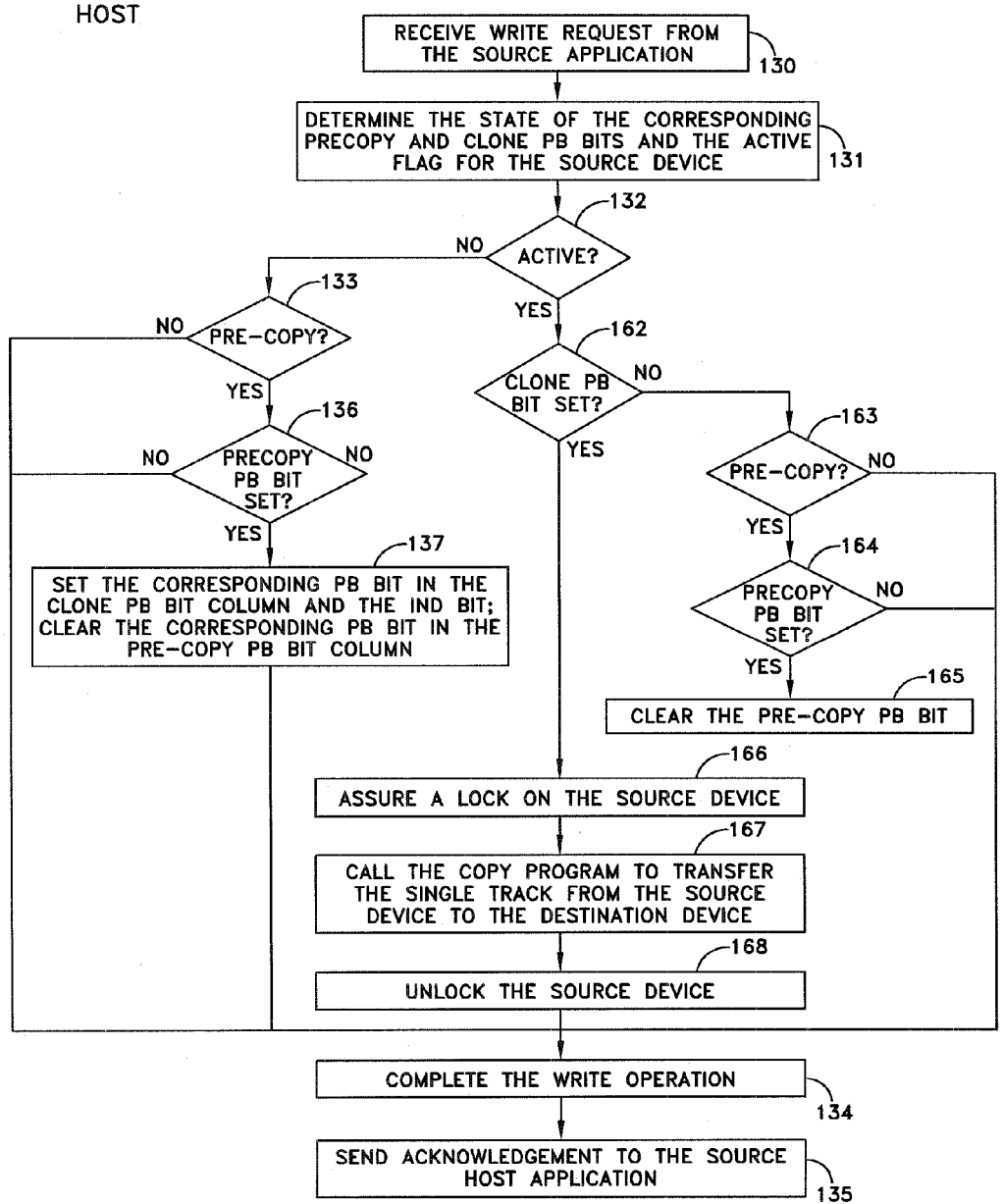
FIG. 6 is a flow diagram that depicts the response of the system to a write request to a predetermined source storage location during the precopy process.

FIG. 6 depicts the process that is responsive whenever a host application writes data to a track in the source device. In this embodiment, the process of FIG. 6 resides in a controller associated with a host adapter, such as the controller 86 in host adapter 26 of FIG. 1. When the controller 86 receives a write request to a track in the source device at step 130, step 131 determines the state of the corresponding CLONE PB bit and the ACTIVE flag 78 in FIG. 2A for the source device.

During a normal write operation, when neither the precopy nor active states exists, step 132 transfers control to step 133 that, in turn, transfers control to steps 134 and 135 to write the data to the corresponding track in the source device and to send an acknowledgment to the host application that sent the write request.

During the precopy process, however, control transfers from step 133 to step 136 to determine if the corresponding PRECOPY PB bit is set. If it is, step 137 reverses the status of the various bits for the track. Specifically, the CLONE PB bit for that track is set; the corresponding IND bit, is set and the corresponding PRECOPY PB bit is cleared. Then control transfers to step 134 and 135 to complete the write operation.

Thus step 137 assures that if a track has previously been copied from the source to the destination device during the precopy process, the data associated with the subsequent write operation will also be transferred. This occurs because step 137 sets the PB bits and IND bit to their original values or states as if no data had yet been transferred during the copy operation.

These operations continue to operate during the precopy process until the ACTIVATE command is sent. That is, the precopy process of FIG. 5 continues to monitor each track in succession to transfer data to the destination device. The write request responsive process of FIG. 6 assures that a record is kept in the various lists constituted by the clone PB and precopy PB columns and the IND bits associated with the source and destination devices. In conjunction, the two processes provide a continuing update of data to each track in the destination device even if that track has previously been transferred.

Figure 7:
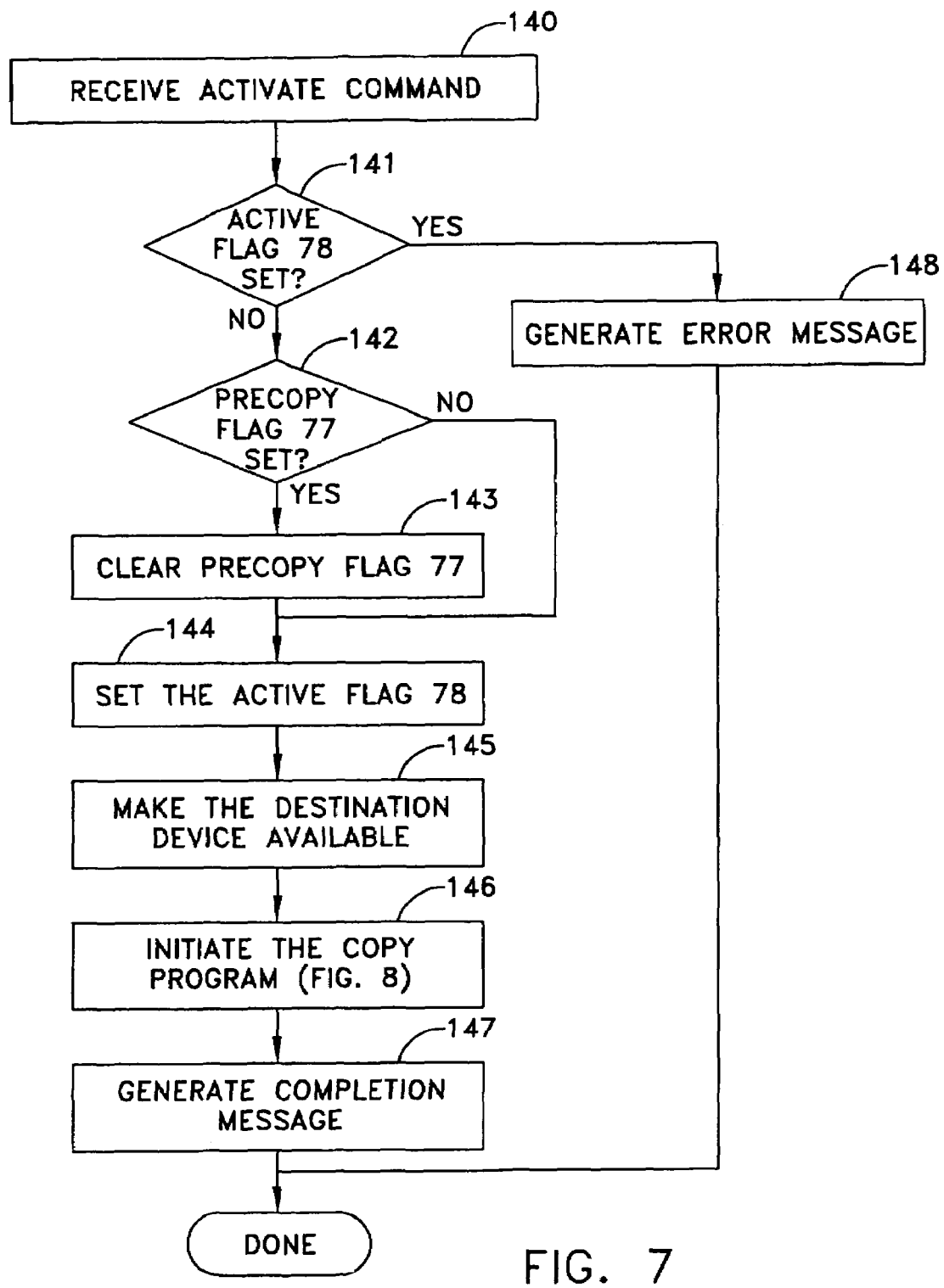
FIG. 7 is a flow diagram of the response to an ACTIVE COPY command that is useful in this invention.
Figure 8:
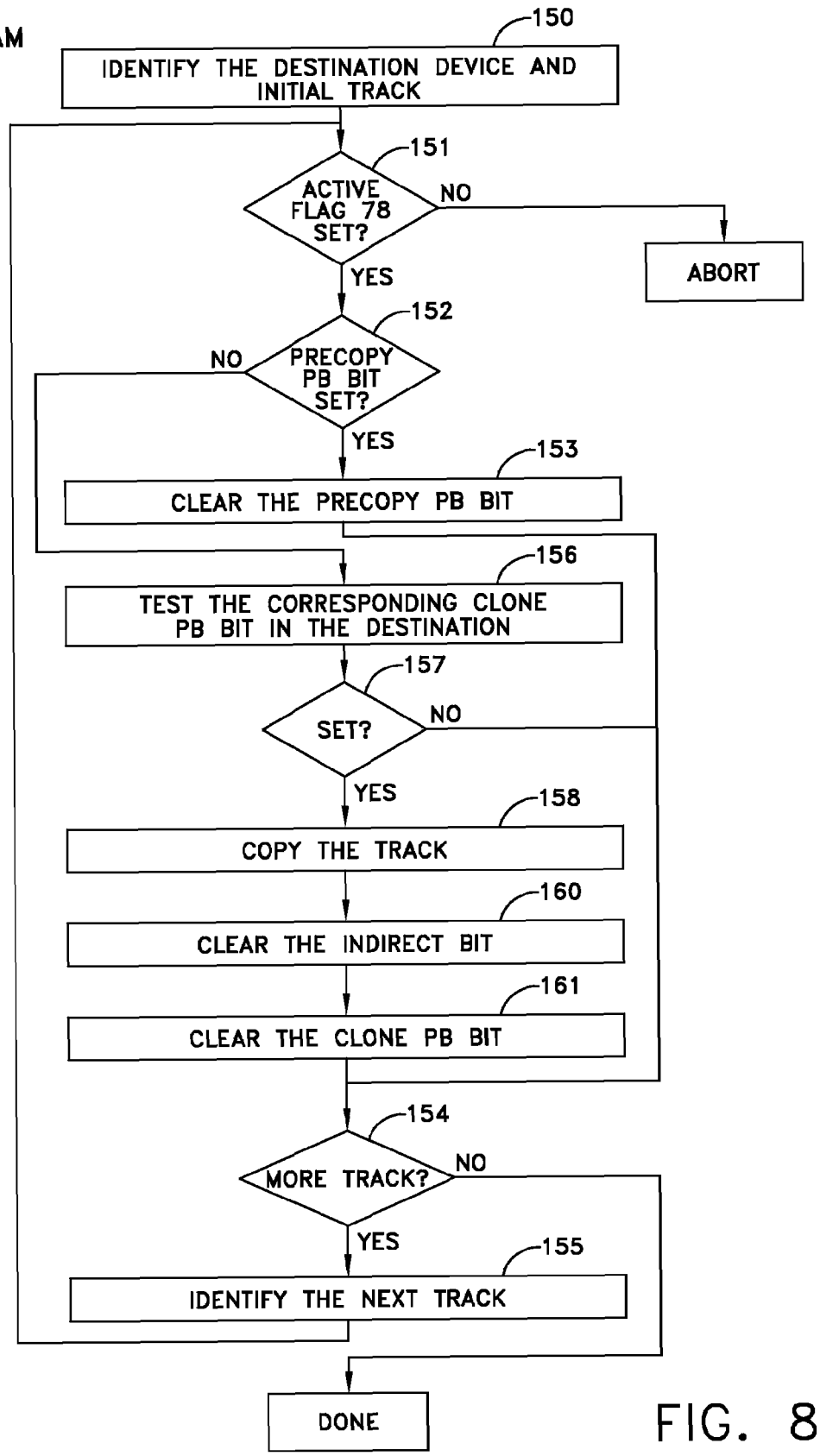
FIG. 8 is a flow diagram of a clone copy program that is useful in this invention.

When the data storage facility 24 in FIG. 1 receives an ACTIVATE command, the data storage facility establishes a second environment wherein the storage locations in the destination device area available for use by another host application and initiates a full copy operation as shown in FIG. 7. Step 140 represents the receipt of the ACTIVATE command. Step 141 tests the ACTIVE flag 78 in FIG. 2A. In a precopy state, the active flag should not be set, so step 141 transfers control to step 142 that tests the PRECOPY flag 77 and transfers control to step 143. Step 143 clears the PRECOPY flag 77. Step 144 then sets the ACTIVE flag 78. Step 145 makes the destination device available for interaction with applications, such as the HOST APP B application 23 in FIG. 1. Step 146 initiates a copy program in the copy programs block of FIG. 1 and as is described in detail in FIG. 8. Step 147 generates a completion message that acknowledges a successful switch to the active state.

If step 141 determines the ACTIVE flag 78 is set, an error condition exists because an ACTIVATE command should not be sent to a device that is already involved in a transfer. In that event step 141 transfers control to step 148 to generate an error message for return to the source of the ACTIVE COPY command.

If the ACTIVE flag 78 is not set and the PRECOPY flag 77 is not set, steps 141 and 142 transfer control directly to step 144. This sequence occurs if an ACTIVATE command makes the destination device immediately available to another application. When an ACTIVATE command issues, step 146 in FIG. 7 initiates the clone copy program of FIG. 8 in place of the precopy program of FIG. 5. Initially step 150 in FIG. 8 identifies the destination device and an initial track in the destination device. Step 151 tests the ACTIVE flag 78 in FIG. 2B. If it is not active, an error condition exists and step 152 institutes a procedure to abort any further operation of the copy program. Otherwise, and normally, step 151 transfers control to step 152. If the precopy PB bit is not set, the track has been copied and the data in the source device track has not subsequently changed. In this event, step 152 transfers control to step 153 to clear that precopy PB bit in step 153. Then control transfers to steps 154 and 155 to determine whether all the tracks are copied and to identify a next track if more tracks need to be received. In that event control transfers back to step 151.

If the precopy PB bit is set, step 152 causes the process to revert to a sequence as shown in step 156 to test the CLONE PB bit of the source device to which the data has been copied. If the data has already been copied during the precopy process, step 157 transfers control to step 154 to determine whether more tracks exist. If the track has not been copied, the CLONE PB bit is set. Step 158 copies the track and step 160 clears the IND bit. Step 161 clears the CLONE PB bit and control transfers to step 154. When all the tracks have been copied, step 154 terminates the procedure.

As will now be apparent, using the precopy process can reduce the number of tracks processed by the active copy program. For example, assume a host application interaction with a logical volume having 1000 tracks and that nearly all the write operations address 100 of those tracks. With this invention, the PRECOPY program could have transferred all 1000 tracks by the time the ACTIVATE command is received. This would reduce the load on the ACTIVE COPY program to only those few tracks that have not been processed. It is even possible that the ACTIVE COPY program will not be required to run.

Referring again to FIG. 6, when a source device receives a write request during the ACTIVATE state, step 132 transfers control to step 162 to determine if the corresponding CLONE PB bit is set. If it is not, then there is an ACTIVATE status with a track that has been copied. However, there is a possibility that the PRECOPY PB bit is cleared so step 162 transfers control to step 163. Step 163 tests the PRECOPY flag 77 in FIG. 2A to determine if this ACTIVATE program is a continuation of a PRECOPY program. If it is, step 164 tests the corresponding PRECOPY PB bit. If it is set, step 165 clears that PRECOPY PB bit. Controls transfers to step 134 to complete the write operation. If the PRECOPY flag 77 is not set or if the PRECOPY PB bit is not set, control transfers to step 134 without operation of step 165.

If step 162 determines that the CLONE PB bit is set, it is necessary to transfer the data that exists on the track. This is accomplished with steps 166 through 168 that, as described in U.S. Pat. No. 6,363,385, block the source device so no additional write operations can occur, transfer the single track from the source to the destination clearing the IND and CLONE PB bit, and unlock the source device so the write operation can be completed in steps 134 and 135.

As will now be appreciated, this invention enhances the data processing operations from several perspectives. Assume it is desired to back up 100 devices at a given time during the evening. In accordance with the prior art, 100 copy commands would be given simultaneously to the 100 devices. This would initiate 100 instances of the copy programs. The resulting initial load could significantly slow responses to write requests directed to the source device and read and write requests directed to the destination device. In addition, there could be a significant interval during which the data on the destination device would not constitute a complete copy of the data as it existed at the time the copy program was initiated.

With this invention, it is possible for a systems administrator to initiate 100 PRECOPY commands over an interval of time. For example, assume an administrator wants to make copies for a backup operation to begin at 11:00PM and determines that sets of 10 PRECOPY commands could copy essentially all the data from 10 source devices in 15 minutes. The administrator could establish a schedule whereby a first set of 10 PRECOPY commands were issued at 8:30 PM and successive sets of 10 PRECOPY commands were issued at 15 minute intervals. This scheduling would minimize the impact of preparing all 100 devices simultaneously.

Moreover, when the ACTIVATE commands were subsequently issued to each of the 100 devices, it is expected that any transfers from the source to the destination would be minimal, so the processes in FIGS. 5 and 10 would operate much shorter duration than they would in the prior implementations.

Figure 9A:
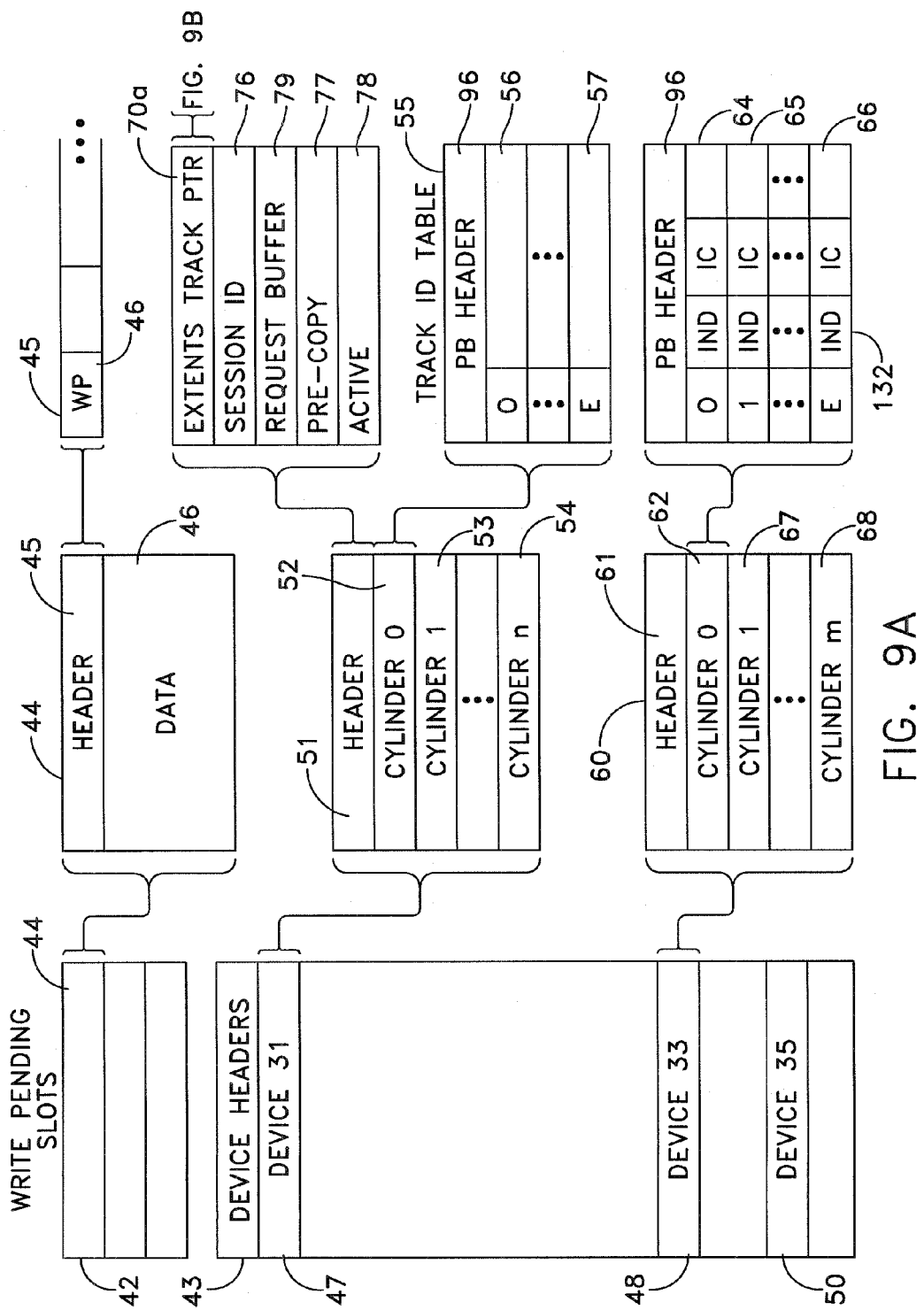
FIGS. 9A and 9B provide a more detailed description of a cache memory shown in FIG. 1 for a mainframe system.
Figure 9B:
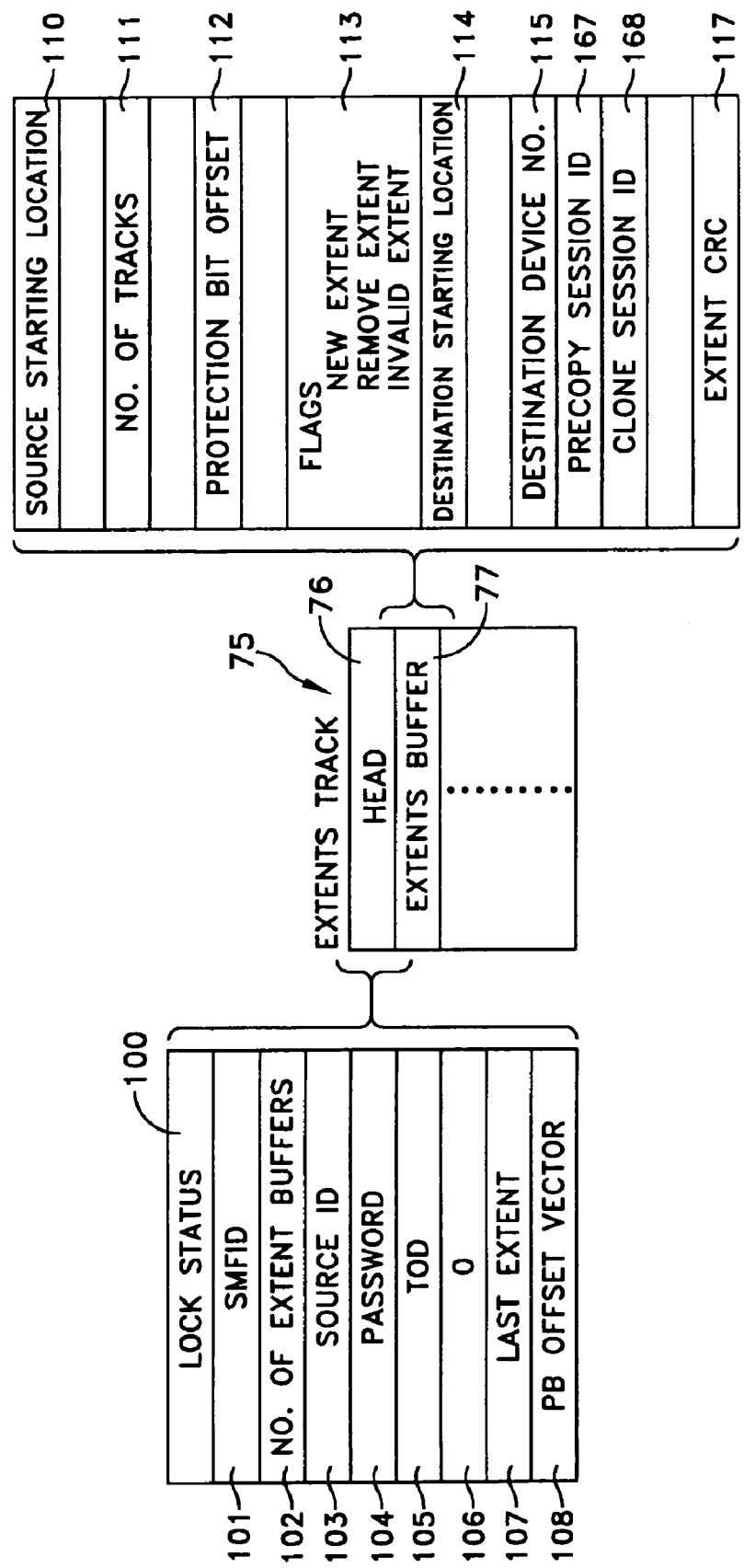

The foregoing description relates to the operation of these commands in connection with an open system environment in which an entire logical device can be transferred. This invention is also applicable to devices operating in a mainframe environment. For a mainframe system, U.S. Pat. No. 6,363,385 discloses a procedure by which sets of selected contiguous tracks or "extents" can be identified for transfer. FIG. 9A depicts the cache organization and is the same as shown in FIG. 2A except for the use of an extents track pointer 70A in lieu of the data structure of FIG. 2B. Further, the extents track pointer 70A that points to a data structure as shown in FIG. 9B. This data structure has the same configuration as shown in FIG. 3 of U.S. Pat. No. 6,363,385 with one addition. Specifically, the extents buffer contains two session IDS, namely a precopy session ID 167 and a clone session ID 168.

Adapting this invention to a mainframe system includes utilizing the procedure shown in FIG. 3 in its entirety. The precopy process of FIG. 4 is then initiated in response to the PRECOPY command and operates in the same manner in respect to an open system implementation.

When the invention is adapted for a mainframe system the information in the clone PB bit column may be ambiguous. A bit position will be cleared if a track is not in the extent or if the data in that track has been transferred. Basically, in a precopy process, the CLONE PB bit positions are set only for the tracks in an extent. However, corresponding bits set in only one or the other of the clone and precopy PB bit positions occur only for these tracks in the extent. If a track is not in an extent, both the corresponding bit positions in the CLONE and PRECOPY PB columns and in the IND bit position will be cleared. If both are set, an error condition exists.

Figure 10:
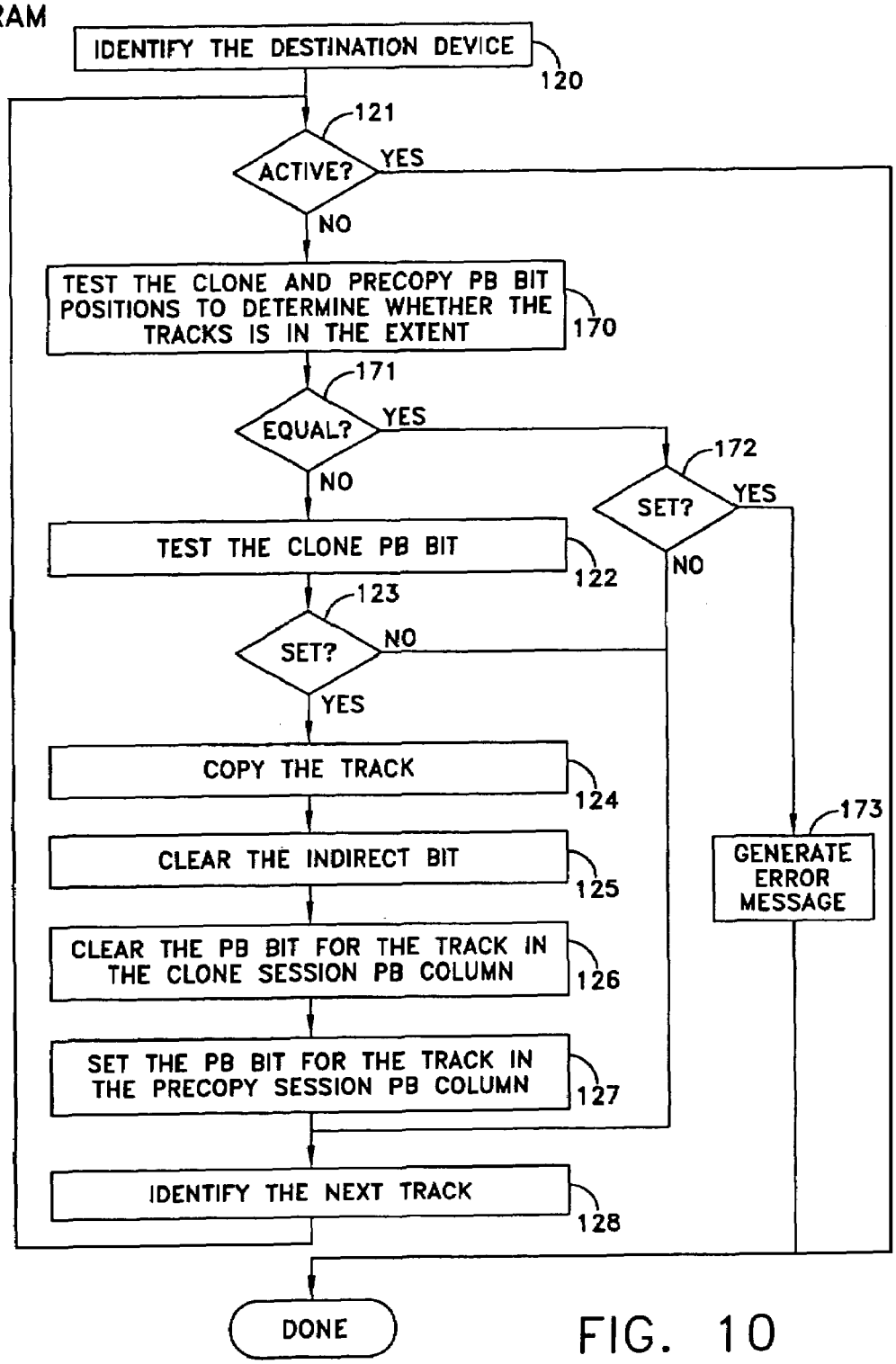
FIG. 10 is a flow diagram of a version of the operation of FIG. 5 adapted for a mainframe system.

Now referring to FIG. 10, the modification to the operation of FIG. 5 requires some steps intermediate to steps 120 and 122. Specifically, each time the process selects a track, step 170 tests the state of the corresponding clone PB and precopy PB bits for the track. During the precopy phase they should be different if the track is in the identified extent. If they are, step 171 transfers control to steps 122 through 127 to copy the data track.

If both the CLONE PB and PRECOPY PB bits are equal, step 171 transfers control to step 128 if they are both cleared because the corresponding track is not in extent. If they are both set, step 173 generates an error message.

Thus it will be apparent that this invention is adapted to a variety of application and particularly to applications for transferring data from source devices or extents in source devices to destination devices. The system is adapted for both open system and mainframe system applications. In each case a precopy command initiates the copy of data without making the data at the destination device available to another application. The use of two sessions or lists such as the CLONE and PRECOPY PB columns provides a control that indicates whether the data in a particular track has been copied or needs to be copied again because it has been rewritten since an earlier copy was made.

The specific description of this invention has been in terms of a single precopy operation. It will become apparent that multiple operations can occur concurrently with a single source device provided that there are sufficient numbers of pairs of available PB columns in the source device header. This invention has also been described in terms of a particular implementation with a specific data storage facility configuration. Specific flags such as the IND flag have been defined. Specific operating sequences have been disclosed. It is understood that the definition of these flags and operating sequences may be altered and others may be eliminated depending upon the configuration and capacities of a particular data storage facility with the attainment of some or all of the objectives of this invention.

It will also be apparent that the foregoing and many other modifications can be made to the disclosed system without departing from the invention. Moreover, the disclosed system is described as an example of a data handling system involving a host and a particular data storage facility. It will be apparent to those of ordinary skill in the art that the basic elements of this invention may be implemented in a wide variety of localized and network environments. Therefore it is the intent of the appended claims to cover all such variations and modifications as come within the true spirit and scope of this invention.

What is claimed as new and desired to be secured by Letters Patent of the United States is:

1. In a data processing system including a host device with applications being adapted for processing data in predetermined storage locations of a source device, a method for copying data from the source device to storage locations in a destination device concurrently with the operation of the at least one application in response to commands identifying the predetermined storage locations, said method comprising the steps in sequence of:
   A) responding to a first command by establishing a first operating environment including the generating of first and second lists of the predetermined storage locations in the source device) and a third list of the predetermined storage locations in the destination device,
   B) initiating a copy process that, for each predetermined storage location, includes:
      i) copying the data from one predetermined storage location in the source device to a corresponding storage location in the destination device, and
      ii) updating each of the lists to indicate that the data has been transferred, and
      iii) responding to a change to a predetermined storage location in the source device by the host application for which a copy has been made, by updating each of the first, second and third lists to denote a change to the data in the first determined location, and
   C) responding to the second command by establishing a second environment wherein the storage locations in the destination device are available for use by another host application.

2. A method as recited in claim 1 wherein each of said lists includes an entry describing the state of a predetermined storage location and said response to the first command includes the steps of:
   i) initializing a precopy flag to a first state, and
      ii) initializing each entry in the first and third lists to a first state and each entry in the second list to a second state.

3. A method as recited in claim 2 wherein said response to the first command includes locking the destination device during said initialization of the lists.

4. A method as recited in claim 3 wherein said response to the first command includes generating a data structure including an identification of the source and destination devices and storing the data structure at said destination device.

5. A method as recited in claim 2 wherein said copying process operates iteratively so long as the precopy flag is in the first state.

6. A method as recited in claim 5 wherein during each iteration of said copy process said updating the corresponding entries in the lists includes the steps of:
   i) changing the states of the corresponding entries in the first and third lists to the second state, and
   ii) changing the state of the corresponding entry in the second list to the first state whereby said first and second lists indicate that the data in the corresponding storage location has been transferred to the destination device.

7. A method as recited in claim 6 wherein the one host application generates a request to write data to a storage location in the source device, said method including the steps of responding to the request by:
   i) testing the entry in the second list for corresponding storage location,
   ii) when the entry is in the first state, transferring the data to the destination device, and
   iii) when the entry is in the second state, transferring the data to the destination device, shifting the states corresponding entries in the first and third lists to the second state and shifting the state of the corresponding entry in the second list to the first state.

8. A method as recited in claim 5 wherein said response to the second command includes:
   i) shifting the precopy flag to a second state,
   ii) initializing an active copy flag to a first state, and
   iii) initiating the operation of an iterative active copy process.

9. A method as recited in claim 8 wherein each iteration of said active copy process includes the steps of:
   i) identifying a storage location, and
   ii) testing the state of the entry in the second list corresponding to the identified storage location.

10. A method as recited in claim 9 wherein said active copy process includes:
    i) when the entry is in the first state, the step of shifting the entry to the second state, and
    ii) when the entry is in the second state, the step of copying the data to the destination device when testing of the state of the corresponding entry indicates that such copying is required.

11. A method for copying data from storage locations in a source device to storage locations in a destination device comprising the steps in sequence of:
    A) responding to a first command by establishing a first operating environment including the generation of first and second lists of the storage locations in the source device containing data to be copied and a third list of the storage locations in the destination device to receive the copy of the data,
    B) initiating a copy process that, for each storage location in the source device, includes:
       i) copying the data from one storage location in the source device to a corresponding storage location in the destination device, and
       ii) updating each of the lists to indicate that the data has been transferred, and
       iii) responding to a change to a storage location in the source device for which a copy has been made, by updating each of the first, second and third lists to denote a change to the data in the changed storage location, and C) responding to the second command by establishing a second environment wherein the storage locations in the destination device are available for use by another host application.

12. A method as recited in claim 11 wherein each of said lists includes an entry describing the state of a predetermined storage location and said response to the first command includes the steps of:

i) initializing a precopy flag to a first state, and ii) initializing each entry in the first and third lists to a first state and each entry in the second list to a second state.

13. A method as recited in claim 12 wherein said response to the first command includes locking the destination device during said initialization of the lists.

14. A method as recited in claim 13 wherein said response to the first command includes generating a data structure including an identification of the source and destination devices and storing the data structure at said destination device.

15. A method as recited in claim 12 wherein said copying process operates iteratively so long as the precopy flag is in the first state.

16. A method as recited in claim 15 wherein during each iteration of said copy process said updating the corresponding entries in the lists includes the steps of:

i) changing the states of the corresponding entries in the first and third lists to the second state, and ii) changing the state of the corresponding entry in the second list to the first state whereby said first and second lists indicate that the data in the corresponding storage location has been transferred to the destination device.

17. A method as recited in claim 16 wherein the source device receives a write request to write data to a storage location in the source device, said method including the steps of responding to the request by:

i) testing the entry in the second list for corresponding storage location, ii) when the entry is in the first state, transferring the data to the destination device, and iii) when the entry is in the second state, transferring the data to the destination device, shifting the states corresponding entries in the first and third lists to the second state and shifting the state of the corresponding entry in the second list to the first state.

18. A method as recited in claim 15 wherein said response to the second command includes:

i) shifting the precopy flag to a second state, ii) initializing an active copy flag to a first state, and iii) initiating the operation of an iterative active copy process.

19. A method as recited in claim 18 wherein each iteration of said active copy process includes the steps of:

i) identifying a storage location, and ii) testing the state of the entry in the second list corresponding to the identified storage location.

20. A method as recited in claim 19 wherein said active copy process includes:

i) when the entry is in the first state, the step of shifting the entry to the second state, and ii) when the entry is in the second state, the step of copying the data to the destination device when testing of the state of the corresponding entry indicates that such copying is required.

21. In a data processing system including a host device that is adapted to process at least one application stored in data tracks of a source device, a method for copying data from the source device data tracks to data tracks in a destination device concurrently with the processing of the at least one application in response to commands from a host application identifying the data tracks, said method comprising the steps in sequence of:

A) responding to a first command by establishing a first operating environment including the step of generating first and second sets of bits wherein each bit position corresponds to a data track in the source device and a third set of bits wherein each bit position corresponds to a data track in the destination device, B) initiating a copy process that, for each predetermined storage location, includes:

i) copying the data from one data track in the source device to a corresponding data track in the destination device, and ii) updating the corresponding bit positions in each of the bit sets to indicate that the data has been transferred, and iii) responding to a change to a track in the source device by the host application for which a copy has been made by updating the corresponding bit positions in each of the first, second and third bit sets to denote the change of data, and C) responding to the second command by establishing a second environment wherein the data tracks in the destination device are available for use by another host application.

22. A method as recited in claim 21 wherein each of said bit sets includes an entry describing the state of a predetermined data track and said response to the first command includes the steps of:

i) initializing a precopy flag to a first state, and ii) setting each bit position in the first and third bit sets and clearing each bit position in the second bit set.

23. A method as recited in claim 22 wherein said response to the first command includes locking the destination device during said initialization of the bit sets.

24. A method as recited in claim 23 wherein said response to the first command includes generating a data structure including an identification of the source and destination devices and storing the data structure at said destination device.

25. A method as recited in claim 22 wherein said copying process operates iteratively so long as the precopy flag is in the first state.

26. A method as recited in claim 25 wherein during each iteration of said copy process said updating the corresponding bit positions in the bit sets includes the steps of:

i) clearing of the corresponding bit positions in the first and third bit sets, and ii) setting the corresponding bit position in the second bit set thereby to indicate that the data in the corresponding data track has been transferred to the destination device.

27. A method as recited in claim 26 wherein the one host application generates a request to write data to a data track in the source device, said method including the steps of responding to the request by:

i) testing the corresponding bit position in the second bit set;

ii) when the corresponding bit is set, transferring the data to the destination device, and iii) when the corresponding bit is cleared, transferring the data to the destination device, clearing the corresponding positions in the first and third bit sets and setting the corresponding bit position in second bit set.

28. A method as recited in claim 25 response to the second command includes:

i) clearing the precopy flag, ii) setting an active copy flag, and iii) initiating the operation of an iterative active copy process.

29. A method as recited in claim 28 wherein each iteration of said active copy process includes the steps of:

i) identifying a data track, and ii) testing the corresponding bit position in the second bit set.

30. A method as recited in claim 29 wherein said active copy process includes:

i) when the corresponding bit position is set, clearing the bit position, and ii) when the corresponding bit position is cleared, copying the data to the destination device.

* * * * *